No. 731,308. PATENTED JUNE 16, 1903.
E. W. JUNGNER.
METHOD OF PRODUCING ELECTRODES FOR ELECTRIC ACCUMULATORS.
APPLICATION FILED AUG. 5, 1901.
NO MODEL.
2 SHEETS—SHEET 1.
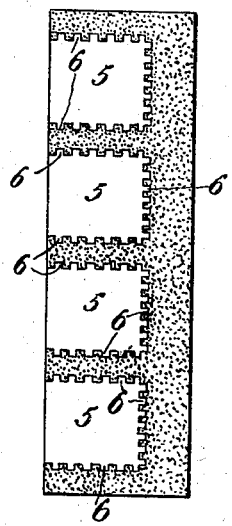

No. 731,308. PATENTED JUNE 16, 1903.
E. W. JUNGNER.
METHOD OF PRODUCING ELECTRODES FOR ELECTRIC ACCUMULATORS.
APPLICATION FILED AUG. 5, 1901.
NO MODEL.
2 SHEETS—SHEET 2.
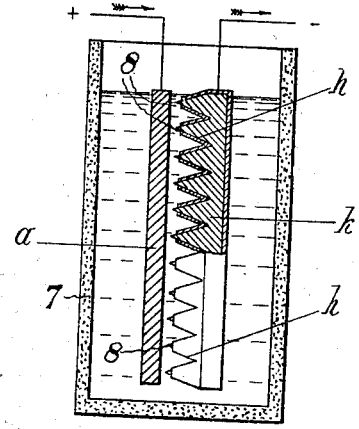
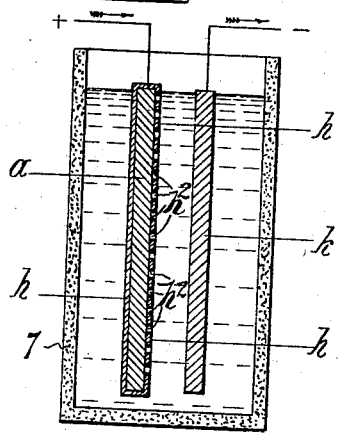

No. 731,308.

Patented June 16, 1903.

UNITED STATES PATENT OFFICE.

ERNST WALDEMAR JUNGNER, OF STOCKHOLM, SWEDEN.

METHOD OF PRODUCING ELECTRODES FOR ELECTRIC ACCUMULATORS.

SPECIFICATION forming part of Letters Patent No. 731,308, dated June 16, 1903.

Application filed August 5, 1901. Serial No. 71,011. (No model.)

*To all whom it may concern:*

Be it known that I, ERNST WALDEMAR JUNGNER, a subject of the King of Sweden and Norway, residing at Stockholm, Sweden, have invented certain new and useful Improvements in Methods of Producing Electrodes for Electric Accumulators; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a method for increasing by electrolytical means the surface of such metals whose oxygen combinations are chemically insoluble in alkaline solutions.

The process consists in that a metallic body is used as anode in an alkaline solution, to which is added a salt whose acid radical forms with the metal a soluble salt for the purpose of obtaining by a kind of corrosion a considerable increase of the surface of said metallic body, by which it is rendered suitable to serve as a carrier for active masses that possess little or no conductivity. Such masses are thus brought into very close (molecular) contact with the conductor, and the electrode made in this manner has a very great activity for receiving and delivering electrical energy.

Referring to the drawings, in which like parts are similarly designated, Figure 1 is a section of a carrier, showing a carrier the surface of which is enlarged. Fig. 2 is a similar view showing one whose surface has been enlarged by electrochemical action. Figs. 3 and 4 illustrate the method of carrying out the process.

If the surface of a plate be provided with cubic recesses 5, that are arranged parallel to one another and very close together, the surface of the plate is increased five times. If, however, the recesses are placed farther apart, the surface will not be increased to such an extent. Now if the walls of these recesses 5 be similarly provided with cubical recesses 6 the surface of the recesses 5 will be likewise increased five times or that of the original plate $5^2$ or twenty-five times. The walls of these last-mentioned recesses 6 can be similarly enlarged, and theoretically the surface can be increased until the recesses become molecular. The recesses of the plate shown in Fig. 2 have been made by electrochemical means.

If a metal plate $a$ with a clean smooth surface is used as anode in an electrolyte such that the metal combination formed by electrolysis is more or less easily soluble, the plate is uniformly attacked at every point; but if, on the other hand, the metal combination formed is substantially insoluble in the electrolyte a coherent layer is immediately formed on the surface of the metal, and the shape of the plate again remains unchanged, as will be the case of sheet-lead in an electrolyte of concentrated sulfuric acid. In a case where the metal combination formed by the electrolyte is soluble with difficulty so-called "points of attack" are formed at those parts of the surface of the electrode where the density of the current is a maximum, and notches or hollows are provided in the metal plate around these points, due to the physical or chemical unhomogenous nature of the plate. Within said hollows and simultaneous with their formation new points of attack arise, around which new hollows are formed, and with these last still further hollows, and so on until they become almost numberless. Such a structure is shown in Fig. 2. In order to produce this structure, it is therefore necessary that the metal combination formed should not be soluble with such great difficulty as to form a layer, and thus prevent further decomposition of the plate, and, secondly, the metal combination should not be soluble to such a degree that it is dissolved by the electrolyte as soon as formed. Consequently it is only necessary that the formation of the metal combination be more rapid than the solution thereof in the electrolyte. The distances between the points of attack on the surface of the plate, as well as the depth of the hollow, depend in addition to the nature of the plate, metal, and the electrolyte on the density of the current, the degree of concentration, and the temperature of the electrolyte, as well as on the physical structure and shape of the surface of the electrode, the distance of the cathode, &c. In order to effect as uniform an enlargement of the surface of the metal plate to act as an electrode-carrier, I place such plate $a$ as anode in a suitable vessel 7 and opposite to it place a cathode $k$, that is provided with points 8 equidistant from one another and also equidistant from the plate to be treated. The whole cathode $k$, Fig. 3, is covered with a neutral and electrically non-conductive material $h$, excepting at the points 8. The points of attack on the surface of the anode $a$ arise in this case at those places that are opposite the points 8 of cathode $k$.

Fig. 4 shows another method of procedure. In this case the anode $a$ is covered with a non-conductive material $h$. In this cover are small circular holes $h^2$ at uniform distances apart, through which the surface of the anode $a$ will be exposed to the action of the electrolyte and current. As soon as the hollows have reached a certain depth the cover can be removed. The points of attack can be arranged so close together that they form, so to speak, "lines of attack." In Fig. 3 the points may be replaced by sharply-pointed projections, straight or curved; but they of course will be insulated up to their edges. These arrangements are in many cases unnecessary, since a uniform hollowing can be obtained by simply roughening the surface with a file or emery-paper, whereby small elevations are produced that form points of attack. The metal combination that has not been dissolved and remains in the hollows may sometimes be used directly as an active mass in a suitable electrolyte and serve to accommodate or supply electrical energy. If the metal combination is not to be used as an active mass, it can be removed from the metal plate by putting the latter into a solution adapted to dissolve it, but not to dissolve the metal itself. Suitable substances can then be pressed or melted and run into the hollows of the metal plate. Plates of all metals that are indifferent in alkali can be treated in the manner described above. Owing to the various circumstances which come into consideration it is necessary to make experiments for each particular case in order to ascertain the most suitable density and size of the hollows with reference to the thickness of the metal plate. Said hollows should in this respect be such that they can be seen with the naked eye, or at least with a weak magnifying-glass. At least the first or largest hollows should be such as to be discerned with the naked eye.

As practical employment of the method described above the following special case may be mentioned: If a plate of pure nickel is placed as anode in a solution of chlorid of sodium, soluble chlorid of nickel is formed and the surface is uniformly attacked at all points, by which no appreciable enlargement of the surface takes place. If the same be also placed as an anode in a concentrated solution of an alkali-metal hydrate, a thin layer of oxid of nickel is formed on the surface of the plate, the said combination being insoluble in alkali, and thus protecting the plate against further effect. If, on the other hand, the solution of chlorid of sodium and alkali are mixed in certain proportions, according to the density of current, temperature, &c., oxychlorids of nickel of various composition—for instance, as stated in the formula below—are formed on the surface of the nickel plate, (especially if the said surface has previously been rubbed with a fine emery-paper or the like.)

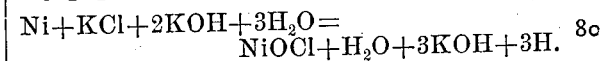
$$Ni+KCl+2KOH+3H_2O=$$
$$NiOCl+H_2O+3KOH+3H.$$

The oxychlorids or nickel are soluble in the electrolyte with difficulty and form on the surface of the electrode a green or greenish-black layer, which can be made very hard and compact by suitable means and which adheres firmly to the metal. If the electrode now is placed as anode in a twenty to thirty per cent. alkaline solution from six to eight hours and with a current of about one ampere per square decimeter, the layer of oxychlorid of nickel next to the metal will be transformed by and by into a high oxygen compound of nickel. If the layer formed on a nickel plate treated in this manner is removed, which can be effected, for instance, by quickly plunging the plate into hydrochloric acid,

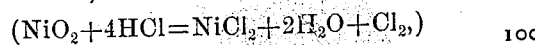
$$(NiO_2+4HCl=NiCl_2+2H_2O+Cl_2,)$$

so that the surface is metallically pure, its greatest porosity can be distinctly seen. If the said plate is then amalgamated in a suitable manner—for instance, by means of a zinc amalgam in diluted hydrochloric acid—and placed as a cathode in a solution of alkali zincate, it is capable of receiving a considerable quantity of zinc, which will adhere thereto. Consequently the said plate can be advantageously used as the electrode in a bath of such solution.

In the same manner as described above with reference to nickel plates other metals can be prepared, so that they can by enlargement of the surface be used as a support for the active mass in electric accumulators with an alkaline electrolyte. This is especially the case with copper, cadmium, and iron, however with suitable modifications and changes with reference to the nature, concentration, and temperature of the electrolytic bath, the density of current, &c. Iron and copper can be treated as anodes in a solution containing ten grams alkali and one to two grams chlorid of sodium for a liter of water, cadmium in a solution of thirty grams chlorid of sodium and ten to fifteen grams alkali for a liter of water. The layer of hydrate of iron in this case, in the same manner as described above, can be removed by being rapidly dissolved in hydrochloric acid. The hollows on the metal surface thus exposed can thereupon be filled with substances which can be used directly or after suitable transformation as an active mass on the iron support in alkaline electrolytes.

The invention can be used in accumulators with unchangeable electrolyte, especially with combinations of silver, nickel, copper, cadmium, and iron.

Having thus described my said invention, what I claim as new therein, and desire to secure by Letters Patent, is—

1. The method of electrolytically increasing the surface of carriers for active masses of accumulator-electrodes that are chemically indifferent to alkaline solutions, which consists in placing a cathode and a plate of a suitable metal, as anode, into a solution of an alkali-metal hydrate containing a suitable salt capable of forming a soluble combination with said metal plate, said combination being soluble in the solution with less rapidity than it is formed, and passing an electric current, substantially as described.

2. The method of making carriers for active masses of accumulator-electrodes that are chemically indifferent to alkaline solutions, which consists in placing a cathode and a plate of a suitable metal, having a roughened surface, into a solution of an alkali-metal hydrate containing a salt capable of forming a soluble combination with said metal, the said combination being soluble in the solution with less rapidity than it is formed, and passing an electric current, substantially as described.

3. The method of making carriers for active masses of accumulator-electrodes that are chemically indifferent to alkaline solutions, which consists in placing a suitable cathode and a suitable metal plate as anode in a solution of an alkali-metal hydrate containing alkali-metal chlorid and passing a current of electricity, substantially as described.

4. The method of making carriers for active masses of accumulator-electrodes that are chemically indifferent to alkaline solutions, which consists in placing a cathode having regularly-disposed conducting-points opposite a plate of a suitable metal as anode in a solution of an alkali-metal hydrate containing a salt capable of forming a combination with said metal that is soluble in the said solution with less rapidity than the formation of the said salt, substantially as described.

In testimony that I claim the foregoing as my invention I have signed my name in presence of two subscribing witnesses.

ERNST WALDEMAR JUNGNER.

Witnesses:
   TH. BOOK,
   E. C. ERICSON.